(12) United States Patent
Skala et al.

(10) Patent No.: US 8,051,992 B2
(45) Date of Patent: Nov. 8, 2011

(54) WATER TRANSFER DEVICE EMPLOYING A WATER BUFFER TO INCREASE WATER FLUX

(75) Inventors: Glenn W Skala, Churchville, NY (US); Yan Zhang, Victor, NY (US); Annette M Brenner, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 857 days.

(21) Appl. No.: 12/020,127

(22) Filed: Jan. 25, 2008

(65) Prior Publication Data
US 2009/0188872 A1  Jul. 30, 2009

(51) Int. Cl.
*B01D 71/28* (2006.01)
*B01D 71/32* (2006.01)
*B01D 71/82* (2006.01)
*H01M 8/02* (2006.01)
*H01M 8/08* (2006.01)
*B01D 71/00* (2006.01)
*H01M 8/00* (2006.01)

(52) U.S. Cl. .............. 210/506; 210/500.35; 210/500.36; 210/500.41; 210/500.42; 210/248; 429/413; 429/414; 429/450

(58) Field of Classification Search .......................... None
See application file for complete search history.

(56) References Cited

U.S. PATENT DOCUMENTS

| 7,875,396 B2 | 1/2011 | Zhang et al. |
| 2003/0138687 A1 | 7/2003 | Iio |
| 2005/0011826 A1* | 1/2005 | Childs et al. ................. 210/490 |
| 2005/0153176 A1 | 7/2005 | Forte et al. |
| 2005/0227130 A1 | 10/2005 | Ahluwalia et al. |
| 2007/0196720 A1* | 8/2007 | Skala ............................ 429/38 |
| 2007/0207362 A1 | 9/2007 | Koenekamp et al. |
| 2008/0001313 A1* | 1/2008 | Zhang et al. ................. 261/100 |

FOREIGN PATENT DOCUMENTS

| CN | 1650456 | 8/2005 |
| CN | 101026243 | 8/2007 |
| CN | 101098021 | 2/2008 |
| DE | 10 2007 009 897 | 1/2008 |

* cited by examiner

*Primary Examiner* — Krishnan S Menon
(74) *Attorney, Agent, or Firm* — Harness, Dickey & Pierce, P.L.C.

(57) ABSTRACT

A water transfer device can include first and second flow paths separated by a water transfer membrane and a hydrophilic diffusion medium. The hydrophilic diffusion medium is disposed between the water transfer membrane and the first flow path. Water content of a first fluid stream flowing through the first flow path is transferred through the diffusion medium and water transfer membrane and into a second fluid stream flowing through the second flow path. The hydrophilic diffusion medium is operable to absorb liquid water in the first fluid stream and hold the absorbed liquid water in contact with the water transfer membrane. The hydrophilic diffusion medium is also operable to diffuse water vapor in the first fluid stream and transport the water vapor to the water transfer membrane. The water transfer membrane transfers the water in contact therewith to the second fluid stream flowing through second flow path.

1 Claim, 4 Drawing Sheets

WATER TRANSFER DEVICE EMPLOYING A WATER BUFFER TO INCREASE WATER FLUX

FIELD

The present disclosure relates to water transfer devices and, particularly, to water transfer membrane assemblies that facilitate the transfer of water between fluid streams passing through a water transfer device.

BACKGROUND

The statements in this section merely provide background information related to the present teachings and may not constitute prior art.

The ability to transfer water between fluid streams that are maintained separate from one another can be useful in a variety of applications. By way of example, one such application is in a fuel cell system wherein one or more of the reactant streams are humidified by another fluid stream.

Fuel cells can be operated in a manner that maintains a membrane, such as a proton exchange membrane (PEM), in a humidified state. The humidity level of the membrane can affect the performance of the fuel cells. The membrane can be damaged if operated in a dry condition which can result in immediate failure or reduction of the useful life of the fuel cells. To humidify the membrane, the fuel cells can be operated in a flooded condition during which the humidity level within the fuel cells is greater than 100% and liquid water is formed during the production of electricity.

To further humidify the membrane, the cathode and/or anode reactant gases being supplied to the fuel cells can be humidified in a water transfer device. The water transfer device can receive a cathode effluent, expelled from the fuel cells, which can contain water in a gaseous and/or liquid state. A portion of the water content of the cathode effluent can be transferred to the cathode or anode reactant gas also flowing through the water transfer device. In this manner, the humidity of the cathode or anode reactant gas can be increased before being supplied to the fuel cell.

The water transfer, or water flux, can be facilitated by a water transfer membrane assembly within the water transfer device. Traditional water transfer membrane assemblies facilitate water flux from only the gaseous portion of the water content while the liquid water portion is expelled from the water transfer device along with the associated fluid stream. Expelling liquid water can be a lost resource. Accordingly, it would be advantageous to have a water transfer device capable of utilizing liquid water to increase water flux. It would be further advantageous to increase the efficiency of the water transfer device. Increased efficiency can advantageously allow the use of a smaller water transfer device to humidify a given fluid stream. Increased efficiency can also advantageously reduce the amount of water lost (unrecovered) from the system within which the water transfer device is utilized.

SUMMARY

A water transfer device according to the present teachings includes a first and second flow path each having an inlet and an outlet for respectively receiving and discharging first and second fluid streams. A water transfer membrane can communicate with and separate the first and second flow paths and can transfer a portion of a water content of a first fluid stream flowing through the first flow path to a second fluid stream flowing through the second flow path. A first diffusion medium can be disposed between the water transfer membrane and the first flow path. The first diffusion medium is hydrophilic and is operable to absorb liquid water in the first flow path, hold the absorbed liquid water in contact with the water transfer membrane, and transfer water to the water transfer membrane. The first diffusion medium is also operable to diffuse water vapor, transport water vapor in the first flow path to the water transfer membrane, and transfer the diffused water vapor to the water transfer membrane.

The water transfer device according to the present teachings can be utilized in a system wherein water content from a cathode effluent stream discharged from a fuel cell stack can be routed through the first flow path and a cathode reactant stream for the fuel cell stack can be routed through the second flow path. Water content from the cathode effluent stream can be transferred to the cathode reactant stream through the hydrophilic diffusion medium and the water transfer membrane separating the two fluid streams.

A method of utilizing the water transfer device according to the present teachings can include: (1) supplying a first fluid stream to the first flow path in the water transfer device, the first fluid stream having a first water content upon entering the first flow path; (2) supplying a second fluid stream to the second flow path in the water transfer device, the second fluid stream having a second water content upon entering the second flow path that is less than the first water content; (3) absorbing liquid water from the first fluid stream with the hydrophilic diffusion medium; (4) transporting the liquid water absorbed by the hydrophilic diffusion medium to the water transfer membrane; (5) diffusing water vapor from the first fluid stream into the hydrophilic diffusion medium; (6) transporting the water vapor diffused in the hydrophilic diffusion medium to the water transfer membrane; and (7) transferring water from the hydrophilic diffusion medium through the water transfer membrane and into the second fluid stream flowing through the second flow path.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Figure 6:
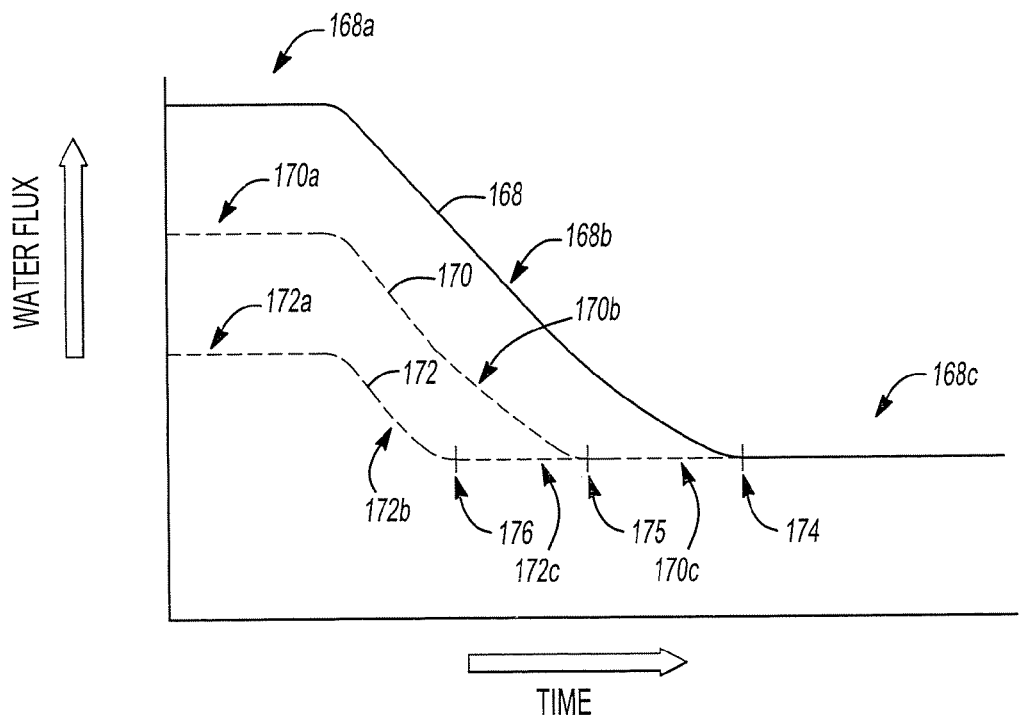
Figure 7:
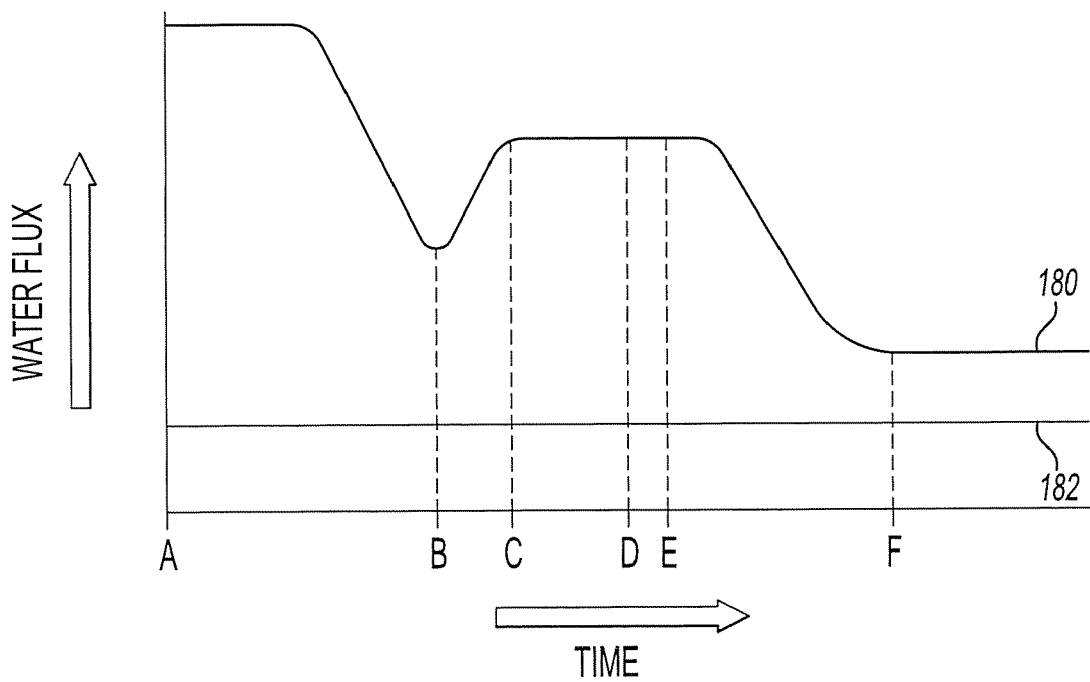

FIG. 6 is a graphical representation of theoretical steady-state water flux response for a water transfer membrane assembly in accordance with the present teachings with and without an initial liquid water buffer; and FIG. 7 is a graphical representation of theoretical water flux responses for different water transfer membrane assemblies during alternating non-steady-state and steady-state operations of a fuel cell system.

DETAILED DESCRIPTION

The following description is merely exemplary in nature and is not intended to limit the present teachings, applications, or uses.

Figure 1:
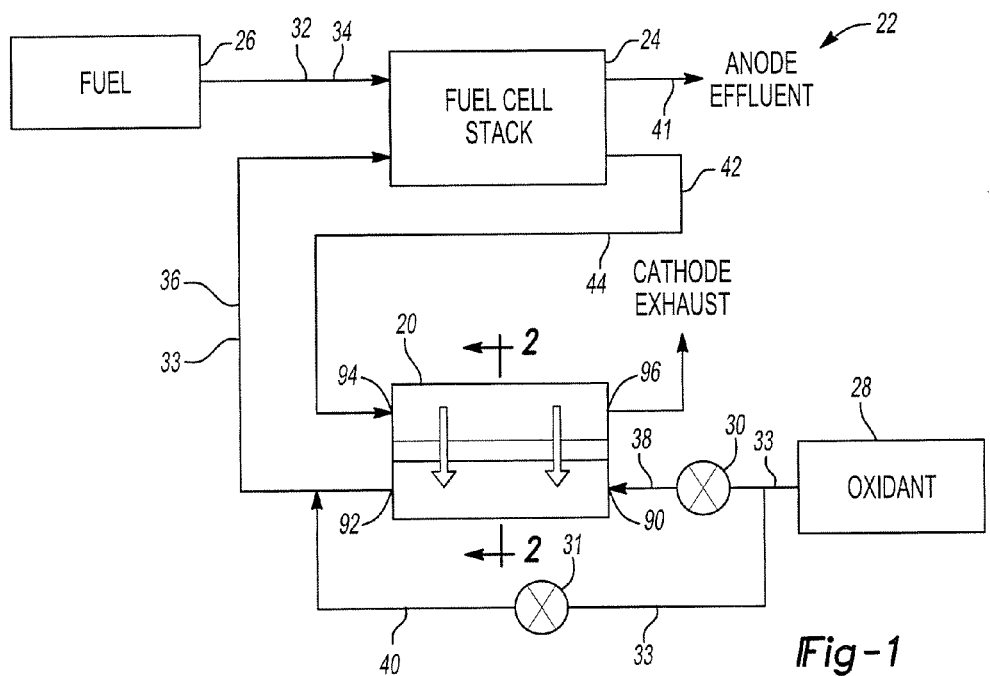
FIG. 1 is a schematic representation of an exemplary fuel cell system utilizing a water transfer device in accordance with the present teachings.

A water transfer device (WTD) 20 according to the present teachings can be utilized in a fuel cell system 22, such as that shown in FIG. 1. Fuel cell system 22 can include WTD 20, a fuel cell stack 24, a fuel (anode reactant) supply 26, an oxidant (cathode reactant) supply 28 and a pair of control valves 30, 31. Anode reactant supply 26 is connected to stack 24 via appropriate supply plumbing 32. An anode reactant stream 34, such as hydrogen, is supplied from anode reactant supply 26 to stack 24 through plumbing 32. Cathode reactant supply 28 is connected to stack 24 via appropriate supply plumbing 33 and provides a cathode reactant stream 36, such as compressed air or oxygen, to stack 24. WTD 20 and control valves 30, 31 can be disposed in supply plumbing 33 between stack 24 and cathode reactant supply 28. A first control valve 30 can adjust a first cathode reactant stream 38 supplied to WTD 20. A second control valve 31 can adjust a second cathode reactant stream 40 that bypasses WTD 20. Streams 38, 40 merge downstream of WTD 20 to form cathode reactant stream 36 supplied to stack 24. Stack 24 is operable to convert anode and cathode reactant streams 34, 36 into electricity, an anode effluent stream 41 and a cathode effluent stream 42. Anode effluent stream 41 can be discharged from stack 24. Cathode effluent stream 42 can flow through WTD 20 prior to being exhausted from fuel cell system 22.

WTD 20 can receive both cathode effluent stream 42 expelled from stack 24 and first cathode reactant stream 38. WTD 20 can maintain cathode effluent stream 42 separate from first cathode reactant stream 38 while transferring a portion of the water content of cathode effluent stream 42 to first cathode reactant stream 38, thereby humidifying cathode reactant stream 36 supplied to stack 24. Bypass valves 30, 31 can adjust the ratio of first and second cathode reactant streams 38, 40 to achieve a desired relative humidity for cathode reactant stream 36.

Figure 2:
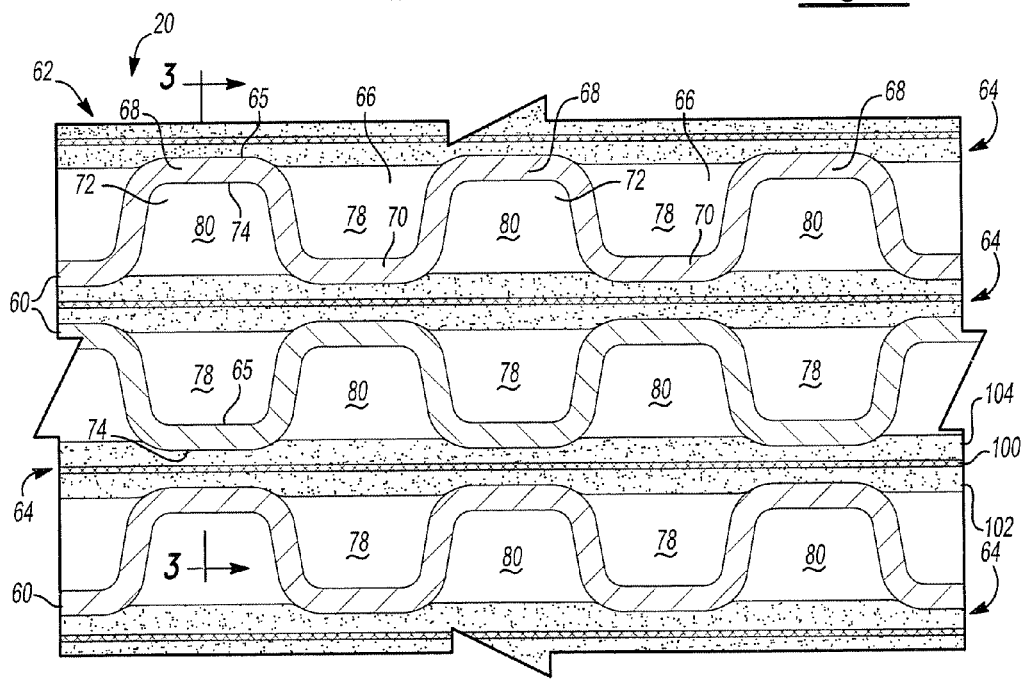
FIG. 2 is an enlarged, fragmented, cross-sectional representation of the water transfer device along line 2-2 of FIG. 1.
Figure 3:
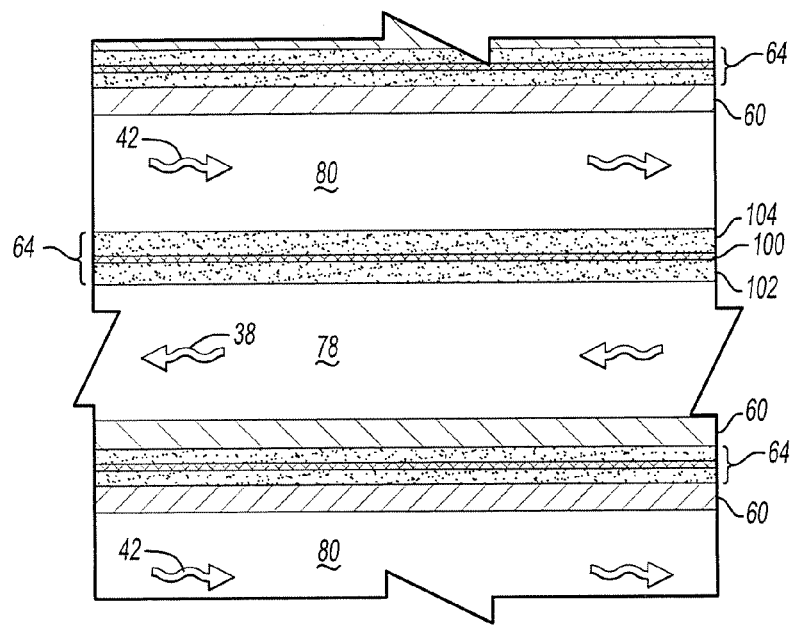
FIG. 3 is an enlarged, fragmented, cross-sectional representation of the water transfer device along line 3-3 of FIG. 2.
Figure 4:
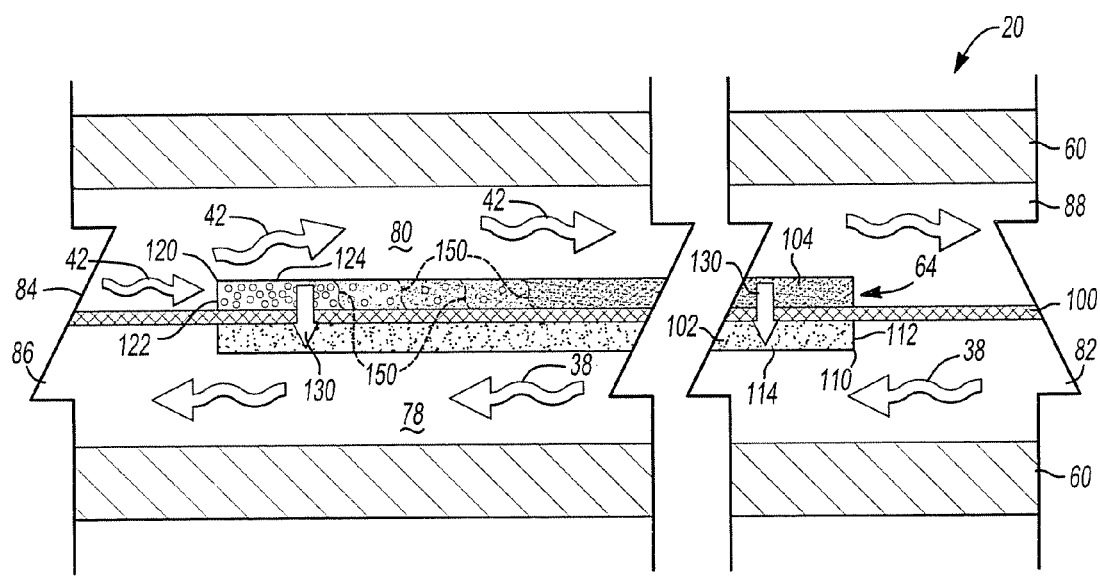
FIG. 4 is an enlarged, fragmented, side view of opposing stream paths within the water vapor transfer device of FIG. 1 separated by a water transfer membrane assembly according to the present teachings.

The fluid flow paths of WTD 20 are shown in greater detail in FIGS. 2-4. Referring to FIG. 2, WTD 20 can include a plurality of plates 60 arranged adjacent one another with water transfer membrane assemblies (WTMA) 64 disposed therebetween. Plates 60 and WTMAs 64 can be clamped together to form a stacked configuration 62. Plate 60 can be a thin sheet of metal, such as stainless steel, or a polymer, by way of non-limiting example. Plate 60 can have a first surface 65 with a plurality of grooves or channels 66 separated by a plurality of lands 68 therebetween. Grooves 66 and lands 68 on first surface 65 form a plurality of lands 70 and grooves 72, respectively, on a second surface 74 of plate 60. Grooves 66, 72 and lands 68, 70 can be arranged in a variety of configurations to provide a desired flow path through WTD 20. Plates 60 can be arranged so that first surface 65 of one plate 60 faces second surface 74 of an adjacent plate 60 with lands 68, 70 on facing first and second surfaces 65, 74 aligned and compressing WTMA 64 therebetween. Grooves 66, 72 in the facing first and second surfaces 65, 74 thereby form a plurality of adjacent flow paths 78, 80 for first cathode reactant stream 38 and cathode effluent stream 42, respectively, separated by WTMA 64. Flow paths 78, 80 mimic the path of grooves 66, 72 formed in plate 60. Water is transferred from cathode effluent stream 42 traversing flow paths 80 to first cathode reactant streams 38 traversing flow paths 78 through WTMA 64, as described below. The number and dimensions of adjacent plates 60 with WTMAs 64 therebetween can vary based on the desired size and operation of WTD 20.

Referring to FIG. 4, each flow path 78, 80 has a respective inlet 82, 84 along a side or edge of plate 60 and a respective outlet 86, 88 formed along the other side or edge for receiving and expelling first cathode reactant stream 38 and cathode effluent stream 42, respectively. The plurality of inlets 82 and outlets 86 of flow path 78 can respectively communicate with a first inlet manifold 90 (FIG. 1) where first cathode reactant stream 38 enters WTD 20 and a first outlet manifold 92 (FIG. 1) where first cathode reactant stream 38 exits WTD 20. Similarly, the plurality of inlets 84 and outlets 88 of flow paths 80 can respectively communicate with a second inlet manifold 94 (FIG. 1) where cathode effluent stream 42 enters WTD 20 and a second outlet manifold 96 (FIG. 1) where cathode effluent stream 42 exits WTD 20. First and second inlet manifolds 90, 94 and first and second outlet manifolds 92, 96 can be located on opposite sides of WTD 20, as shown, such that first cathode reactant stream 38 and cathode effluent stream 42 flow in opposite directions (counter-flow) through WTD 20. It should be appreciated, however, that co-flow or cross-flow arrangements can be utilized. Additionally, while generally horizontal flow paths 78, 80 are shown, it should be appreciated that generally vertical flow paths or arrangements therebetween could be utilized although all of the benefits of the present teachings may not be realized.

Referring to FIGS. 2-4, WTMA 64 can include a water transfer membrane 100 disposed between first and second diffusion media 102, 104. First diffusion medium 102 can face flow paths 78 and communicate with first cathode reactant stream 38 while second diffusion medium 104 can face flow paths 80 and communicate with cathode effluent stream 42. First and second diffusion media 102, 104 can provide structural support to water transfer membrane 100, thereby inhibiting deformation of water transfer membrane 100. In some embodiments, membrane 100 can be coated on one or both of the diffusion mediums 102, 104.

As shown in FIG. 4, first diffusion medium 102 borders flow path 78 on one side and abuts water transfer membrane 100 on the opposite side. A leading edge 110, defined by a first face 112, which can be substantially perpendicular to flow path 78, and a second face 114, which can be substantially parallel to flow path 78, is located near inlet 82, such that first face 112 is immediately exposed to first cathode reactant stream 38 when it enters flow path 78. Similarly, second diffusion medium 104 borders flow path 80 on one side and abuts water transfer membrane 100 on the opposite side. A leading edge 120, defined by a first face 122, which can be substantially perpendicular to flow path 80, and a second face 124, which can be substantially parallel to flow path 80, is located near inlet 84, such that first face 122 is immediately exposed to cathode effluent stream 42 when it enters flow path 80. In an embodiment where membrane 100 is coated on the diffusion mediums 102, 104, the diffusion mediums 102, 104 can extend the length of membrane 100. It should be appreciated that different methods of gasketing and orientations of plates 60 can alter this configuration.

First diffusion medium 102 can be a thin porous material that can capture and diffuse gaseous fluids. First diffusion medium 102 can be hydrophobic in that it can absorb water vapor while repelling liquid water. Such diffusion medium can be made from a variety of materials. For example, first diffusion medium 102 can be Toray T030 or Toray T060 paper available from Fuel Cell Store of Boulder, Colo., or other fibrous mat or support on the order of 100 um. First diffusion medium 102 can diffuse water transferred through membrane 100 into cathode reactant stream 38 flowing through flow paths 78.

Second diffusion medium 104 can be hydrophilic in that it can absorb both liquid water and water vapor from cathode effluent stream 42 and facilitate communication between both liquid water and water vapor with water transfer membrane 100, as described below. Second diffusion medium 104 can be a thin porous material, such as Toray T030 or Toray T060 paper available from Fuel Cell Store of Boulder, Colo., or other fibrous mat or support on the order of 100 um. Second diffusion medium 104, if not hydrophilic by nature, can have a solution of polyethylene glycol diacrylate and polyethylene glycol acrylate cured thereon by ultra violet light or other hydrophilic treatments. Alternatively, second diffusion medium 104 can be a thin hydrophilic coating applied directly to water transfer membrane 100.

Water transfer membrane 100 has one side in contact with first diffusion medium 102 and a second side in contact with second diffusion medium 104. Water transfer membrane 100 can be a thin, micro-porous or dense membrane that can allow water in cathode effluent stream 42 to pass therethrough and humidify first cathode reactant stream 38. Water transfer membrane 100 can take a variety of forms. For example, water transfer membrane 100 can be NAFION® 112 available from DuPont of Wilmington, Del. Some dense membranes like NAFION® 112, as explained below, exhibit a step change in water flux when in contact with liquid water. Water transfer membranes having such a step change in water flux can advantageously be utilized in the present teachings.

During typical operation of fuel cell system 22, cathode effluent stream 42 can have a higher water content than first cathode reactant stream 38. The water content of cathode effluent stream 42 can be in both gaseous and liquid form. In WTD 20, WTMA 64 separates flow paths 78, 80 and facilitates water transfer (water flux), indicated by arrows 130 in FIG. 4, from cathode effluent stream 42 to first cathode reactant stream 38. To facilitate this water flux, the liquid portion of cathode effluent stream 42 is desired to be captured by second diffusion medium 104 as it contacts and flows across faces 122, 124, as described below. The hydrophilic properties of second diffusion medium 104 facilitate the capturing of the liquid water content of cathode effluent stream 42 and dispersing the captured liquid water to the surface of water transfer membrane 100. As a result of liquid water contacting with the surface of water transfer membrane 100, the water flux 130 through water transfer membrane 100 is enhanced. As water is transported from cathode effluent stream 42 to first cathode reactant stream 38 through water transfer member 100 along flow path 80, the water content in cathode effluent stream 42 is reduced and expelled from WTD 20 through second outlet manifold 96 having a water content less than when it entered WTD 20.

Simultaneous to the flow of cathode effluent stream 42 through WTD 20, first cathode reactant stream 38 enters WTD 20 through first inlet manifold 90 and flows through flow paths 78. While traversing flow paths 78, first cathode reactant stream 38 is in direct communication with first diffusion medium 102. A portion of first cathode reactant stream 38 can be captured by first diffusion medium 102 and diffused throughout the rest of first diffusion medium 102 as it contacts and flows across faces 112, 114. The diffused portion can traverse first diffusion medium 102 until it is in communication with water transfer membrane 100. The diffused first cathode reactant stream 38 can absorb some of the water flux 130 held within and transferred through water transfer membrane 100. The diffused first cathode reactant stream 38 re-enters flow path 78 after absorbing the water flux 130 and is replaced by newly captured and diffused first cathode reactant stream 38. As a result, first cathode reactant stream 38 exits WTD 20 through first outlet manifold 92 having a water content greater than when it entered WTD 20.

Optimizing water flux 130 from cathode effluent stream 42 to cathode reactant stream 36 is desirable to help fuel cell system 22 maintain the membrane in stack 24 at a desired humidity level. The present teachings achieve this goal by improving the water flux 130 across water transfer membrane 100, as set forth below.

As previously discussed, the water content of cathode effluent stream 42 can be comprised of both water vapor and liquid water generated by fuel cell system 22. The rate of liquid water generation ($F_G$) in stack 24 can vary as the operation of fuel cell system 22 changes. Operation of fuel cell system 22 can be characterized as nominal operation and transient operation. Nominal operation generally corresponds to when the current load on stack 24 remains generally constant. Transient operation can correspond to when the current load on stack 24 is changing and when fuel cell system 22 undergoes a cold start.

Ideally, the liquid water generation rate ($F_G$) during nominal operation of fuel cell system 22 will be zero and all of the water content generated by stack 24 is in vapor form. However, some liquid water can be generated by stack 24 during nominal operation or some condensation can occur within stack 24 and/or cathode effluent plumbing 44. The condensation can be more pronounced as the relative humidity of cathode effluent stream 42 increases. The liquid water generation rate ($F_G$) can remain generally constant during nominal operation. For example, the liquid water generation rate ($F_G$) of stack 24 can be about $1.3 \times 10^{-5}$ gm/(sec cm$^2$ stack membrane area) when stack 24 is outputting a substantially constant current load of about 0.4 A/cm$^2$ and operating at about 60° C. As another example, the liquid water generation rate ($F_G$) of can be about $1.1 \times 10^{-4}$ gm/(sec cm$^2$ stack membrane area) when stack 24 is outputting a substantially constant current load of about 1.5 A/cm$^2$ and operating at about 40° C. These current loads can approximate representative higher and lower current loads on stack 24 during nominal operation. Hereinafter, WTD 20 operation corresponding to nominal operation of fuel cell system 22 when the liquid water generation rate ($F_G$) is generally constant is referred to as steady-state operation.

During transient operation of stack 24, the liquid water generation rate ($F_G$) can change and rapid liquid water generation spikes can occur. Cold starts, in particular, can create a large spike in the liquid water generation rate ($F_G$). Similarly, transitions from one current load to another current load can cause the liquid water generation rate ($F_G$) to increase or decrease. Hereinafter, WTD 20 operation corresponding to transient operation of fuel cell system 22 wherein the liquid water generation rate ($F_G$) can change and/or spike is referred to as non-steady-state operation.

WTDs of the prior art have membrane assemblies with hydrophobic diffusion media on both sides of the water transfer membrane and expel the liquid water or have no diffusion media. The hydrophobic diffusion media inhibits liquid water absorption and communication with the water transfer membrane. Once expelled, the liquid water is not recovered, and the potential water flux of the liquid water is lost. During steady-state operation, this non-realized water flux may be small because the quantity of liquid water can be small.

However, the non-realized water flux can be more pronounced during non-steady-state operation. With no diffusion media, membrane surface area is lost.

WTD 20, particularly WTMA 64, of the present teachings can advantageously increase water flux of WTD 20 when cathode effluent stream 42 contains liquid water by realizing at least a portion of the potential water flux of the liquid water instead of simply expelling the liquid water from WTD 20. This water flux increase over typical prior art WTDs is described below.

Figure 5:
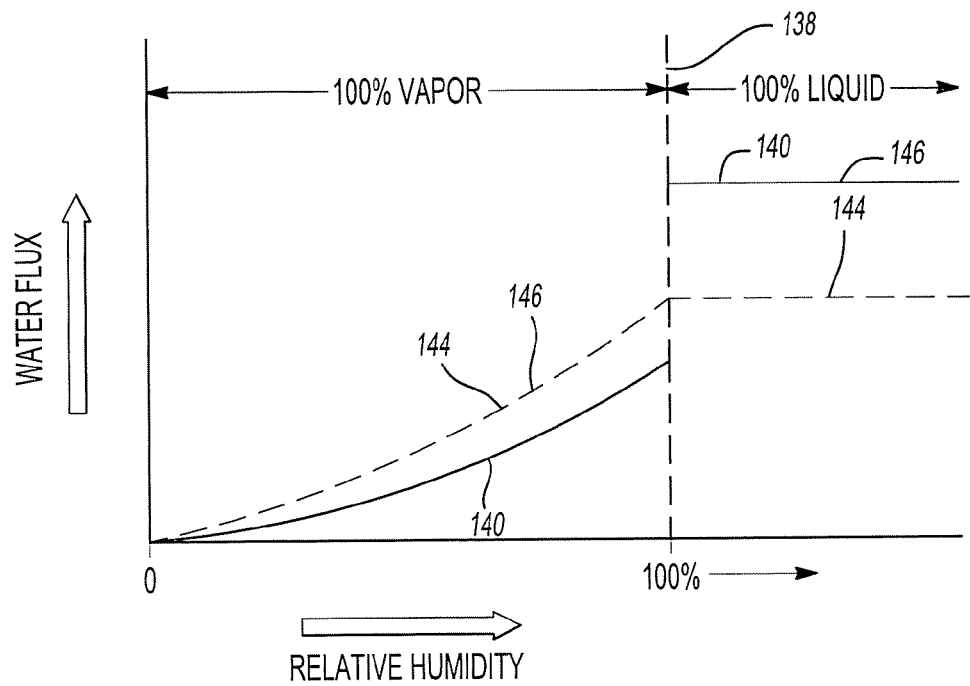
FIG. 5 is a graphical representation of theoretical water flux for a water transfer membrane, a typical prior art water transfer membrane assembly, and a water transfer membrane assembly in accordance with the present teachings as a function of relative humidity of a first fluid in communication therewith.

In FIG. 5, a graphical representation of theoretical water fluxes of a bare water transfer membrane 100, of a WTMA of the prior art (both diffusion mediums being hydrophobic), and of a WTMA 64 according to the present teaching (the diffusion media in contact with the relatively more humid fluid stream (donor fluid stream) being hydrophilic with the other diffusion media being hydrophobic) that are believed to occur as a function of increasing relative humidity of the donor fluid stream in contact therewith and when the water content of the donor fluid stream results in a 100% liquid water in contact therewith is shown. The transition between water vapor and 100% liquid water is represented by vertical line 138. The water flux for a bare water transfer membrane 100 is represented by curve 140. As shown, the water flux 140 increases as the relative humidity of the donor fluid stream increases. A maximum water vapor flux 140 is achieved when the relative humidity of the donor fluid stream reaches 100% and changes to liquid water. The water flux 140 undergoes a step change when the donor fluid stream transitions from 100% water vapor (0% liquid water) to 100% liquid water in contact therewith. As shown, a maximum water flux is achieved when the water content is 100% liquid water in contact with the bare water transfer membrane 100.

The water flux for the MTMA of the prior art (which have hydrophobic diffusion media on both sides) is represented by curve 144. Similar to the water flux 140 for the bare water transfer membrane 100, water flux 144 increases as the relative humidity of the donor fluid stream increases. A maximum water vapor flux is achieved as the relative humidity of the donor fluid stream approaches 100%. As illustrated, the use of hydrophobic diffusion media and their associated diffusive properties increase the water flux versus that of the bare water transfer membrane while the donor fluid stream does not contain liquid water. It is believed that this is achieved by the hydrophobic diffusion media facilitating communication between the humid fluid stream and the water transfer membrane along with the diffusion media supporting the water transfer membrane away from the lands of the flow field. However, water flux 144 is believed to be maintained at about the same maximum value level as 100% vapor when in contact with 100% liquid, as indicated by the portion of curve 144 to the right of transition line 138. This constant water flux 144 is believed to occur because the hydrophobic diffusion media prevents liquid water from access to the surface of the water transfer membrane, thus the water flux increase as a result of contacting with liquid water is not realized.

Water flux for a WTMA 64 according to the present teachings is represented by curve 146. Curve 146 is shown as being identical to curve 144 when the water in the donor fluid stream is in vapor form because it is believed that the use of either a hydrophilic or hydrophobic diffusion media in contact with the humid donor fluid stream has a negligible difference on the water flux when the water content is in the vapor form. As shown, however, when WMTA 64 is in contact with liquid water, water flux jumps significantly and is shown as being identical to that of curve 140 to the right of transition line 138. It is believed that the hydrophilic diffusion media in contact with the liquid water causes WTMA 64 to allow the liquid water portion of the fluid stream to communicate directly with the water transfer membrane 100 therein, thereby taking advantage of the step change in the water flux of water transfer membrane 100 when in contact with liquid water. Thus, in WTMA 64, a maximum water flux is believed to be achieved when the fluid stream has transitioned to 100% liquid water in contact with the hydrophilic diffusion media therein.

It should be appreciated that the water flux curves 140, 144, 146 of FIG. 5 are theoretical and exemplary in nature and do not reflect actual data points. Furthermore, it should also be appreciated that curves 144 and 146 to the left of transition line 138 may differ from one another depending on, among other things, the diffusive properties of the diffusion media in contact with the donor fluid stream.

When comparing the water flux trends shown in FIG. 5, it is apparent that the water flux over a given surface area of water transfer membrane 100 will be higher when in communication with liquid water than when in communication with water vapor. Thus, the water flux during operation of WTD 20 can be increased by facilitating communication between liquid water therein and water transfer membrane 100. As shown by water flux curve 146, the use of a hydrophilic second diffusion medium 104, in contact with the donor fluid stream and with the water transfer membrane 100, can facilitate the communication between the liquid water and the water transfer membrane 100. The hydrophilic second diffusion medium 104 can absorb a portion of the liquid water generated during steady-state and non-steady-state operation that would otherwise be expelled from the WTDs of the prior art (due to the use of hydrophobic diffusion media) and hold the absorbed liquid water in contact with water transfer membrane 100. The potential water flux of the absorbed liquid water can then be realized by a WTD 20 according to the present teachings.

Returning now to FIG. 4, as cathode effluent stream 42 enters flow path 80, gravity will cause liquid water to fall toward the bottom of flow path 80. As the liquid water traverses flow path 80, the liquid water can encounter first face 122 of second diffusion medium 104. Second diffusion medium 104 can absorb the liquid water through first face 122 creating a wicking effect whereby liquid water entering flow path 80 can be wicked out of flow path 80 and into second diffusion medium 104.

It can be desirable that a wickability ($F_S$), the rate at which the liquid water can be wicked from flow path 80, of second diffusion medium 104 is greater than the liquid water generation rate ($F_G$) during steady-state operation to help maintain flow path 80 unobstructed by liquid water. Unobstructed flow path 80 can allow a greater quantity of cathode effluent stream 42 to enter WTD 20 and communicate with water transfer membranes 100, thereby improving water flux.

Wickability ($F_S$) can be defined as a volume of water that can be absorbed on a face of the diffusion medium in a finite period of time and can be represented as:

$$F_S = D_w A/L$$

where $F_S$=wickability (gram/s);

$D_w$=wicking coefficient (g/cm-s);

L=length over which wicking occurs (cm); and

A=cross-sectional area of wicking material (cm$^2$).

As can be seen in equation (1), wickability ($F_S$) can be affected by the wicking coefficient ($D_W$) of the diffusion medium, the length (L) and the cross-sectional area (A) of the diffusion medium. The length L and the cross-sectional depth of the diffusion medium will generally be determined by the length and quantity of flow paths 78, 80 necessary to generate the desired water flux during steady-state operation. The cross-sectional thickness will generally be limited by the vapor diffusion requirements of the diffusion medium, as discussed below.

The wicking coefficient ($D_W$) of the diffusion medium is determined by the fundamental material properties of the diffusion media, which can be affected by the surface property (i.e., contact angle, porosity, and pore size of the diffusion media), and can be represented as:

$$D_w = P*C/v \quad (2)$$

where
$D_W$=wicking coefficient (gram/cm-s);
P=permeability (cm2);
C=capillary pressure (kPa); and
v=kinematic viscosity (KPa sec cm$^3$/gm).

As can be seen in equation (2), the wicking coefficient ($D_W$) can be effected by, among other things, the permeability (P) of the diffusion medium to water, the capillary pressure (C), and the kinematic viscosity (v). Permeability of the diffusion medium can be affected by porosity and an average pore diameter of the diffusion medium. The capillary pressure of the diffusion medium, which is the force generated by liquid in the capillaries, can be affected by the surface tension of liquid water, contact angle, and the average pore diameter.

It should be appreciated from equations (1) and (2) and the previous discussion that the wickability ($F_S$) for the diffusion medium can be increased or decreased by, among other things, altering the cross-sectional thickness, porosity, surface tension of water, contact angle, and average pore diameter of the diffusion medium. The diffusion medium can be selected whereby the aforementioned diffusion medium properties result in a wicking coefficient ($D_W$) that ensures the wickability ($F_S$) is greater than the liquid water generation rate ($F_G$) during steady-state operation (i.e., $F_S > F_G$). For example, a diffusion medium having a wicking coefficient ($D_W$) greater than about 0.2 gram/cm-s can result in a wickability ($F_S$) greater than the liquid water generation rate ($F_G$) of fuel cell system 22 operating at a low current load for the example given above. For another example, a wicking coefficient greater than about 13 g/cm-s can result in a wickability ($F_S$) higher than the liquid water generation rate ($F_G$) of fuel cell system 22 operating at a higher current load for the example given above.

Referring again to FIG. 4, the absorbed and wicked liquid water can saturate a portion of second diffusion medium 104 near leading edge 120. The saturated portion is held in communication with water transfer membrane 100 over a liquid communication area, thereby generating liquid water flux into water transfer membrane 100. The remaining unsaturated volume of second diffusion medium 104 can absorb the water vapor portion of cathode effluent stream 42, diffuse the absorbed water vapor throughout the remaining unsaturated volume and hold the diffused water vapor in communication with water transfer membrane 100, thereby generating water vapor flux into water transfer membrane 100. The total water flux of WTD 20 during operation of fuel cell system 22 is a combination of the liquid water flux and the water vapor flux. It will therefore be appreciated that because the membrane assemblies of the prior art do not utilize liquid water to generate water flux, the total water flux of WTMA 64 can be greater than the total water flux of the membrane assemblies of the prior art.

During non-steady-state operation, the liquid water generation rate ($F_G$) may exceed the wickability ($F_S$) of second diffusion medium 104 (i.e., $F_G > F_S$). When this occurs, liquid water can spill over leading edge 120 and be absorbed by both the first and second faces 122, 124. A buffer of liquid water can be created along and within second diffusion medium 104. The buffer can expand as it continues to absorb liquid water at a rate faster than the water flux into the first cathode reactant stream 38, propagating along the length of second diffusion medium 104, as shown by propagation lines 150 in FIG. 4. The buffer can expand until the entire volume of second diffusion medium 104 is saturated. The buffering capability of hydrophilic second diffusion medium 104 can thereby advantageously absorb spikes of liquid water generation that may otherwise be expelled from a WTD of the prior art. It should be appreciated, however, that when second diffusion medium 104 is completely saturated and cannot absorb any more liquid water, the unabsorbed liquid water can be expelled from WTD 20 along with the cathode effluent stream 42.

The buffering capability of hydrophilic second diffusion medium 104 can advantageously maintain the water flux of WTD 20 at an elevated level. The buffering capability can advantageously provide for liquid water flux into water transfer membrane 100 as the buffered liquid water within second diffusion medium 104 is dispersed to the surface of the water transfer membrane 100. During periods when a water buffer is present, the water flux is maintained at an elevated level. The buffering can maintain this water flux at the high level during periods of time when the liquid water generation rate ($F_G$) is less than the wickability ($F_S$) of second diffusion medium 104. Additionally, when the liquid water generation rate ($F_G$) is less than the wickability ($F_S$) of second diffusion medium 104 and greater than the water flux 130 through water transfer membrane 100, second diffusion medium 104 can increase the liquid water buffer therein up until second diffusion medium 104 becomes saturated. Thus, during operation of WTD 20, the liquid water buffering of second diffusion medium 104 can increase or decrease as the operation of the fuel cell system 22 changes.

Referring now to FIG. 6, the theoretical water flux with respect to time for WTMAs 64 having different initial water buffers is shown. In the graph of FIG. 6, it is assumed that no liquid water is being generated and, as a result, the buffer in the WTMAs 64 shown decrease over time as water flux is transferred through water transfer membrane 100 and into the fluid flow on the opposite side of WTMAs 64. Curves 168, 170, 172 represent the change in water flux over time for generally identical WTMAs 64 having decreasing initial buffer volumes which correspond to decreasing liquid communication areas. The liquid communication area is the surface area of water transfer membrane 100 in contact with liquid water. A corresponding buffer volume is the saturated volume of second diffusion medium 104 directly above the liquid communication area. It is believed that liquid water flux occurs generally uniformly over the liquid communication area, thereby depleting the buffer generally uniformly. It is further believed that the liquid communication area remains generally constant as the buffer is depleted. The uniform depletion can create a period of substantially steady water flux through WTMAs 64, as represented by the generally flat elevated portions 168a, 170a, 172a of respective curves 168, 170, 172, as the buffer volume is depleted. Once the buffer volume is depleted and the liquid communication area contracts, the water flux begins to decrease, as represented by portions 168b, 170b, 172b of respective curves 168, 170, 172. When the buffer volume is depleted and the liquid communication area is gone (only water vapor in contact with water transfer membrane 100), the water flux returns to a steady-state water flux, as represented by portions 168c, 170c, 172c of respective curves 168, 170, 172. It can be appreciated from the shape of curves 168, 170, 172 that for decreasing initial liquid communication areas (decreasing buffer volumes), the time required to change from the elevated water flux rate (portions 168a, 170a, 172a) to the steady-state water flux rate (portions 168c, 170c, 172c) can decrease, as represented by transition points 174, 175, 176 for respective curves 168, 170, 172. It should be appreciated that the period of substantially steady flux at the elevated rate (portions 168a, 170a, 172a) can be extended by increasing the cross-sectional thickness of second diffusion medium 104, thereby increasing the buffer volume.

Referring now to FIG. 7, a theoretical comparison between the performance of a WTMA 64 according to the present teachings and a prior art WMTA (having a hydrophobic diffusion medium on both sides) that may occur due to fluctuations in the operation of fuel cell system 22 between non-steady-state and steady-state operation are shown. In this theoretical example, time period A corresponds to a cold start-up of fuel cell system 22 such that a large quantity of liquid water can be generated and result in providing a significant buffer to WTMAs 64. Immediately following startup, steady-state operation of fuel cell system 22 commences. At point B, a non-steady-state operation of fuel cell system 22 occurs and liquid water is generated that can be utilized to replenish the buffer of WTMAs 64. Point C corresponds to a change in operation of fuel cell system 22 to a steady-state operation wherein liquid water is not being generated. At time D, operation of fuel cell system 22 is again changed and there is a short period of non-steady-state operation and for a short duration of time liquid water is again being produced. At time E, the fuel cell system 22 again changes operation to a steady-state operation wherein liquid water is no longer being produced and the steady-state operation continues for the remainder of the time period shown in FIG. 7.

During the exemplary operation shown in FIG. 7, the water flux for WTMAs 64 is represented by curve 180 and, as shown, undergoes various responses to the changing operation of fuel cell system 22 between non-steady-state and steady-state operation. At time A, which immediately follows a cold start-up, a maximum buffer is created within second diffusion medium 104 and the water flux is at an elevated value. As the buffer is depleted due to steady-state operation between time periods A and B, the water flux remains substantially constant until the liquid communication area begins to contract and the water flux decreases. The water flux trend between times A and B can generally correspond to that of curve 168 of FIG. 6.

At time period B, the beginning of a non-steady-state operation results in the creation of liquid water that can replenish the buffer of WTMAs 64 and, as a result, the water flux begins to increase as the liquid communication area expands. At time C, when fuel cell system 22 returns to steady-state operation and the generation of liquid water ceases, the water flux remains substantially constant at an elevated value as the buffer of WTMAs 64 is utilized. Between points D and E, the brief transition to non-steady-state operation and the generation of liquid water can help to replenish the water buffer and thereby extend the duration of the substantially constant and elevated water flux that began at time period C. As the buffer begins to be consumed and the liquid contact area decreases, the water flux again begins to decrease and approaches a steady-state water flux wherein the buffer is depleted and no liquid water is present in WTMAs 64 at time period F. The transition can generally correspond to one of curves 170, 172 of FIG. 6. Thus, as the fuel cell system 22 transitions between steady-state and non-steady-state operation, the presence of the buffering capability of WTMAs 64 can result in varying degrees of water flux.

In contrast to the water flux capabilities of WTMAs 64, the water flux in a theoretical water flux for a prior art WTMA (hydrophobic diffusion medium on both sides) for the same occurrence events is represented by curve 182. The representative water flux is substantially constant. For purposes of this comparison, it is assumed that the generation of liquid water during the cold start-up and during the periods of non-steady-state operation have a negligible effect on the water flux due to the hydrophobic nature of the diffusion media helping to purge the liquid water from a prior art WTD, thus preventing the liquid water having access to the surface of the membrane to enhance the water flux. Thus, in this situation the water flux of a prior art WTMA is believed to remain substantially constant.

It should be appreciated that the difference between the areas beneath curves 180 and 182 represents the water influx increase that can be realized by WTD 20 utilizing WTMAs 64 according to the present teachings. It should also be appreciated that the water flux curves of FIGS. 6 and 7 are exemplary and theoretical examples and do not reflect actual water flux data points.

During operation of WTD 20 within a fuel cell system 22, the quantity of liquid water relative to the quantity of water vapor in cathode effluent stream 42 can vary. As a result, the type of water flux (liquid water flux and/or water vapor flux) during these periods can also vary. Accordingly, it is desirable that WTD 20 is operable to generate adequate water flux during both steady-state and non-steady-state operation of fuel cell system 22 and the associated changes in the ratio of the quantity of liquid water to the quantity of water vapor in cathode effluent stream 42. Thus, the diffusion mediums of WTMAs 64 (i.e., 104 and 102), can be designed to ensure the water vapor transport.

As mentioned above, wickability of second diffusion medium 104 can be affected by the porosity, pore size, and the thickness of the diffusion media. These properties can also affect water vapor diffusion. As the porosity increases, the resistance for the water vapor transferring to the surface of the membrane will be decreased, which facilitates the water flux. However, if the porosity is too large, the mechanical integrity of the diffusion medium will be compromised. Reducing the diffusion media thickness reduces the distance for the water vapor to the surface of the membrane, thus enhances the water vapor flux. However reducing the diffusion media thickness might reduce the membrane surface utilization under land (i.e., membrane area adjacent to surface 65), and thus could compromise the water vapor flux. In addition, reducing the diffusion media thickness could also reduce the wickability and buffering ability of the hydrophilic diffusion media 104.

It is preferred that diffusion mediums 102 and 104 have porosity greater than about 70%, preferably in the range of 70-85%, and the thickness of the diffusion media is less than 0.2 mm, preferably in the range of 0.05-0.1 mm. To optimize the water vapor transport through the diffusion media, it is preferred that diffusion mediums 102 and 104 having a pore size in the range of 1-50 micrometers.

While the present teachings have been described with reference to specific examples and configurations, it should be appreciated that changes and deviations from the examples shown can be employed while still being encompassed by the present teachings and be within the scope of the claims. For example, it should be appreciated that the configuration of WTD 20 is not limited to a planar (stacked-plate) configuration. The WTD 20 can be configured as a tube, spiral wound, or other known WTD configurations that facilitate the transfer of water between fluid streams passing therethrough. Additionally, while the properties for second diffusion medium 104 have been stated, it should be appreciated that other values and/or combinations of properties may achieve a desired balance between the water vapor flux capabilities and the liquid water flux capabilities for a WTD 20 according to the present teachings. Furthermore, first diffusion media 102 can by hydrophilic, if desired.

What is claimed is:

1. A water transfer device comprising:
   a first flow path having an inlet and an outlet for receiving and discharging a first fluid stream;
   a second flow path having an inlet and an outlet for receiving and discharging a second fluid stream;
   a water transfer membrane in communication with and separating said first and second flow paths, said water transfer membrane operable to transfer a portion of a water content of a first fluid stream flowing through said first flow path to a second fluid stream flowing through said second flow path; and
   a first diffusion medium disposed between said water transfer membrane and said first flow path, said first diffusion medium being hydrophilic and operable to absorb liquid water in said first flow path, hold said absorbed liquid water in contact with said water transfer membrane, and transfer water to said water transfer membrane, and operable to diffuse water vapor, and transfer said water vapor to said water transfer membrane, wherein said first diffusion medium is made hydrophilic by curing thereon a solution of polyethylene glycol diacrylate and polyethylene glycol acrylate.

* * * * *